United States Patent [19]
Hicks et al.

[11] 3,817,267
[45] June 18, 1974

[54] VALVE DEVICE FOR DRAINING LIQUID CONTAMINANT COLLECTED FROM COMPRESSED GAS

[75] Inventors: William Robert George Hicks, Stratford-upon-Avon; Richard John Leslie Newman; Leslie William Smith, both of Shipston-on-Stour; Michael John Wates, Pershore, all of England

[73] Assignee: C. A. Norgren Co., Littleton, Colo.

[22] Filed: Sept. 29, 1972

[21] Appl. No.: 293,558

[30] Foreign Application Priority Data
Sept. 30, 1971 Great Britain............... 45589/71

[52] U.S. Cl.............. 137/204, 137/517, 251/353, 251/354
[51] Int. Cl............................................. F16t 1/00
[58] Field of Search ........... 137/204, 223, 517, 519, 137/533.21, 543; 251/349, 354; 55/218, 210, 428, 430, 431, 432, 433; 285/DIG. 22

[56] References Cited
UNITED STATES PATENTS

| | | | |
|---|---|---|---|
| 201,870 | 4/1878 | Conradt | 251/354 X |
| 559,504 | 5/1896 | Sullivan | 137/533.21 X |
| 738,503 | 9/1903 | Waters | 285/DIG. 22 |
| 996,600 | 6/1911 | Stotts | 137/517 |
| 1,190,402 | 7/1916 | Hamilton | 251/354 |
| 1,839,413 | 1/1932 | Sage | 251/354 X |
| 2,232,899 | 2/1941 | Aikman | 137/204 |
| 2,323,764 | 7/1943 | Gustafsson et al. | 137/204 |
| 2,801,067 | 7/1957 | Mercier | 137/517 X |
| 3,682,194 | 8/1972 | Pyle | 137/204 |

Primary Examiner—Robert G. Nilson
Attorney, Agent, or Firm—Sheridan, Ross & Fields

[57] ABSTRACT

A drain valve device is provided adapted for draining liquid contaminant such as oil and/or water, collected from compressed air or other gas. The valve is closable by the gas pressure and loaded to open when the pressure sufficiently falls to permit the discharge of collected contaminant. The device incorporates a captive contaminant outlet tube separate from the valve and manually displaceable to operate and open the valve against the gas pressure. The tube may project from the valve casing sufficiently to enable it to be gripped and displaced to operate the valve without the risk of contaminant or compressed gas coming into contact with the operator's hand. An external drain pipe may be coupled to the tube and displaced from a remote position to operate the valve. The tube can be snapped into a captive position in relation to the valve casing while being axially displaceable relatively to the casing for operating the valve. The casing may comprise a skirt which is slotted and elastically expansible and provided with projections and a collar on the outlet tube can be forced past the projections to captivate the tube.

8 Claims, 1 Drawing Figure

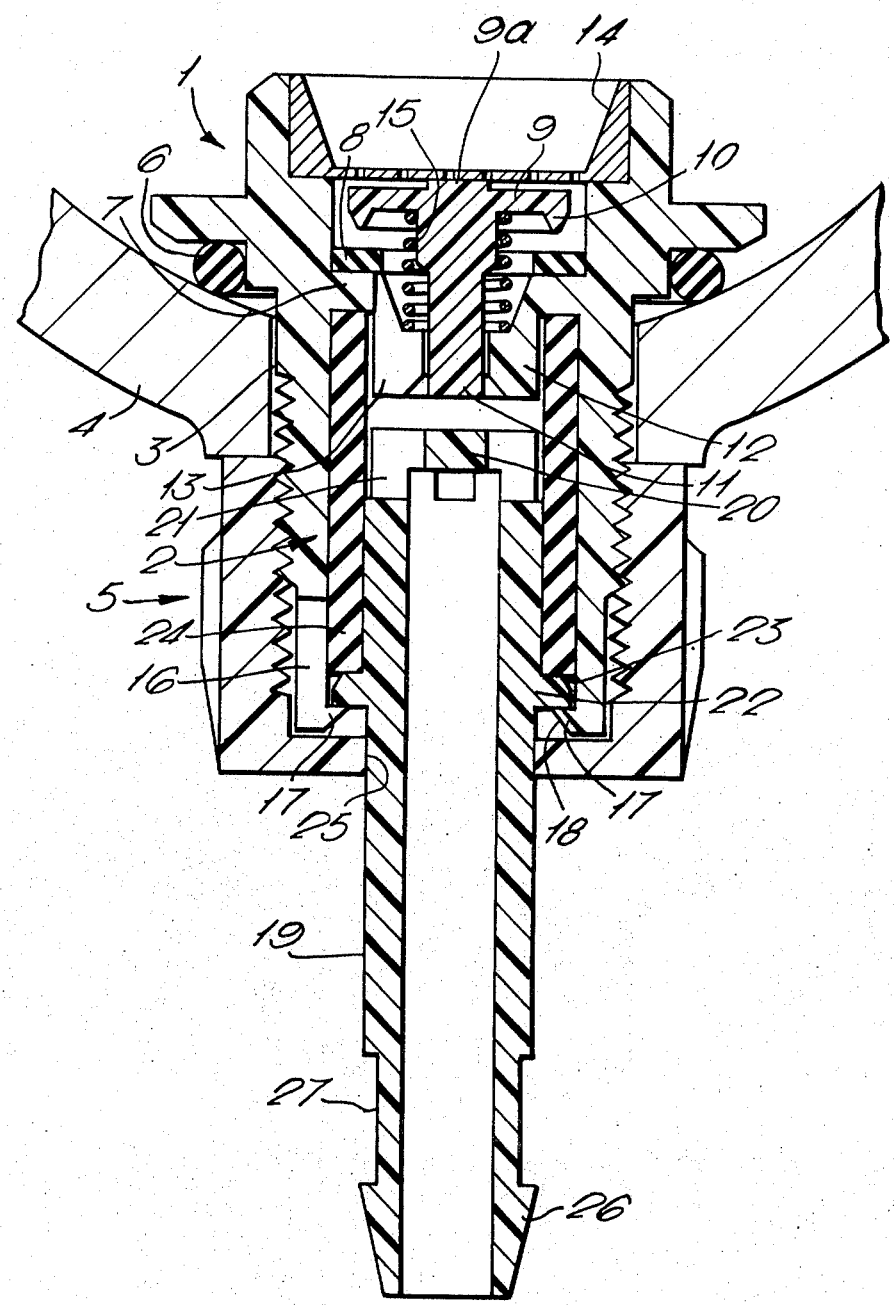

VALVE DEVICE FOR DRAINING LIQUID CONTAMINANT COLLECTED FROM COMPRESSED GAS

This invention relates to a valve device for draining liquid contaminant collected from compressed gas, e.g., compressed air.

Such contaminants are frequently collected in compressed air filters and receivers and compressed air mains.

Manually operated drain valves are well known in this connection but require constant attention by an operator to prevent the liquid from reaching an unacceptable level.

Automatic control of discharge by float or other mechanisms responsive to changes in liquid level and piston or diaphragm mechanisms responsive to changes of pressure within a reservoir brought about by changes in flow rate tend to be either complicated and expensive or undesirably bulky.

Float-operated valves are more suited for heavy liquid contamination and for systems that remain pressurised for long periods of time and units operated by pressure variation due to flow change frequently do not open automatically when the pressure is released and under conditions of steady flow may never operate unless manually tripped.

Spring loaded valves are known which are designed to open automatically when the gas pressure falls below a certain level e.g., to atmospheric pressure or a pressure somewaht higher, to permit drainage of the collected liquid.

Such valves are well suited for small plants where the pressurised system is shut down each night or even more frequently and low levels of liquid contamination are involved. They drain automatically but have several disadvantages.

Thus some of these valves cannot be manually operated although manual operation is desirable if heavy liquid contamination occurs between normal pressure release cycles, or, where manual operation has been permitted, this has been by direct operation of the valve and involves bringing the operator's hand adjacent to the discharge so that a hazard exists, since, under the action of high pressure compressed air during discharge, abrasions or cuts in the hand may be penetrated and the blood stream affected.

In some cases the only access to the valve is by way of a stem thereof in the outlet but even where some projection is present this usually has to be to a small extent and even so the valve may be directly manually operated and the aforesaid hazard obtains.

Frequently the valve may be situated at a level above ground e.g., some 12 feet, which makes it difficult of access. It is not practicable then to extend the valve stem to within easy reach because of the liability to accidental damage. Moreover, it is highly desirable that the device should permit of a drain pipe or hose being appropriately connected thereto so that the discharge can be at a suitable lower level, while still allowing the valve to be manually opened while the air pressure subsists.

The present invention aims at an improved valve which will close automatically in response to gas pressure but can be manually opened without the said hazard to the operator and preferably lends itself to coupling to a pipe or hose for discharge from, and manual operation at, a position remote from the valve.

To this end the present invention provides a drain valve device adapted for draining liquid contaminants, such as oil and/or water, collected from compressed air or other gas, the valve being closable by the gas pressure and loaded to open when the gas pressure sufficiently falls to permit the discharge of collected contaminant, and a captive contaminant-outlet tube separate from the valve and manually displaceable to operate and open the valve against the gas pressure. Preferably the said outlet tube projects from the valve casing sufficiently to enable it to be gripped and displaced to operate the valve, without the risk of contaminant or compressed gas coming into contact with the operator's hand.

The valve is preferably spring-loaded to open when the pressure sufficiently falls.

The valve casing may be formed so that the outlet tube can snap into a captive position in relation thereto while being axially displaceable relatively to said casing for operating the valve. The casing may include a skirt which is slotted for elastic expansion and has internal projections past which a collar on the outlet tube can be forced to captivate the tube. This action may be facilitated by chamfering the inner edges of the projections and the outer edge of the collar. This casing part may be made wholly of a resilient plastics or other material which will permit of such elastic expansion.

The device may include a resilient sleeve which is axially compressible by the collar during the insertion of the outlet tube so that it spring-urges the collar against the projections when the tube is fully inserted and seals the tube with the casing while permitting axial displacement of the tube to displace the valve.

The outlet tube may have a spider-like inlet end for actuating the valve while permitting passage of contaminant into the tube.

The outlet tube may be formed for externally coupling to a pipe or hose for discharging remotely from the valve e.g., at a lower level. This is especially desirable when the valve is disposed, as is frequently the case, at a high level as aforesaid. Displacement of the pipe or hose e.g., by the operator grasping it at its end remote from the valve, will displace the outlet tube and operate the valve, again without risk of the operator's hand being exposed to the discharge of contaminant and the compressed air.

The valve device herein described, also lends itself to construction wholly or mainly from plastics. The valve itself may form the disc-like head of a stem and have an annular rib, e.g., of conical section, to engage an annular seating which may comprise a ring of resilient material. The valve casing may be basically of (a) a body part formed with the said skirt which is passed through an aperture in a collecting bowl, e.g., of a compressed air filter, and is externally screw-threaded, and a nut which engages said screw threaded skirt to clamp the device to the bowl and seal it thereto by way of an O-ring.

The valve may be retained against withdrawal in a direction away from its seating by a screen which prevents dirt from having access to the valve and its seating. The valve may be constructed so as not unduly to reduce the effective area of the screen. For example, the disc-like head of the valve may have a short central stub or projection to engage the screen.

In order that the invention may be the more clearly understood reference is hereinafter made to the accompanying drawing in which one embodiment of the invention is illustrated by way of example, secured in the bottom of a bowl which may be regarded for example as the bowl of a compressed air filter.

The device has a two part casing, viz., a body part 1 having an externally threaded skirt 2 for passage through a hole 3 in the bottom of the bowl 4 and a nut 5 which engages the skirt 2 for clamping the device in the bowl, and sealing it to the bowl with the aid of an O-ring 6.

The body part 1 is formed with an internal flange 7 provided with a resilient annular member 8 which serves as a valve seating. The valve has a disc-like head 9 formed with an annular rib 10 to engage the seating and with a stem 11 which passes through ring portion 12 of the body part 1, this ring part being slotted at 13 to permit flow into the skirt region of the device. The valve is retained against withdrawal in a direction away from its seating by a screen 14 which is pressed into the body part 1 of the casing and prevents dirt particles from reaching the valve and its seating. The valve is loaded by a helical spring 15 tending to maintain the valve open, i.e., in the position illustrated. In order that the valve shall not unduly block the screening area, its disc-like head 9 has a short stub or projection 9a to engage the screen.

The end of the skirt 2 remote from the valve is formed with slots 16 and with inward lugs or projections 17 the inner edges of which are chamfered at 18. This end of the skirt is thus made elastically expansible, the body part 1 which includes the skirt being of a material of a resilient character.

Compressed air having access to the filter bowl 4 will, at working pressure, force the valve head 9 onto its seating 8 against the pressure of the spring 15. When the pressure falls sufficiently, e.g. has lowered to atmospheric pressure or a pressure somewhat higher, the spring 15 will prevail and open the valve. Liquid contaminant such as oil and/or water which has been filtered out and collected in the bottom of the bowl 4 can then flow past the valve.

As previously stated however it is required to permit manual operation of the valve without the hazard of the operator's hand being exposed to the contaminant and air pressure.

Therefore the device includes an outlet tube 19 which is separate from the valve and the inlet end of which is of spider-like form to provide a centre element 20 for co-operation with the valve stem and angled radial arms 21 to provide spaces permitting flow into the tube. This tube is snapped into a captive position in relation to the valve casing. For this purpose it is formed with a collar 22 the periphery of which is chamfered at 23 so that it can be forced past the projections 17 on the skirt, and be retained in connection with the device.

A resilient sealing sleeve 24, e.g., of a suitable rubber such as a nitrile rubber or neoprene, is arranged in the skirt and is axially compressed by the collar 22 in inserting the outlet tube 19 against the flange 7 of the body part 1. This sleeve not only acts as a seal to prevent liquid from by-passing the outlet tube but it acts as a spring to hold the tube in place, viz., with the collar 22 against the projections 17, in a position in which it frees the valve stem for closure of the valve by the air pressure.

When however it is required to operate the valve manually to open it against the air pressure, the tube can be displaced axially. The centre element 20, engaging the valve stem 11, forces the valve off its seating to allow a contaminant liquid collected in the bowl to discharge through the slots 13 and by way of the spidered end of the outlet tube 19 through the latter to discharge. In so displacing the outlet tube, the sleeve 24 is axially compressed and forces the tube back into position when the axial pressure on the tube is released. The tube can be readily gripped externally so that the hand of the operator can be kept clear of the discharge and the air under pressure.

The bottom hole 25 in the nut is smaller in diameter than the collar 22 on the outlet tube 19 so that the tube cannot become detached even if it is moved past the projections.

The tube is a captive part of the device and direct manual access to the valve is precluded.

On assembly, the valve seat 8, spring 15 and valve 9-11, are assembled into the body part 1 and then retained in position during the rest of the assembly operation by the screen 14 which is pressed into position. The resilient sleeve 24 is inserted into the skirt 2 and the outlet tube 19 then snapped into position past the projections 17 at the elastically yieldable end of the skirt.

The assembly is now self-supporting and may be stocked and shipped in this manner before being installed. It is not necessary to fit the retaining nut 5 but for convenience in stocking and shipping this would normally be done.

However when the nut 5 is removed to insert the mechanisms into the reservoir the outlet tube 19 is still firmly retained.

Whilst the inherent strength of the skirt is quite adequate to maintain co-operation between the expansible end of the skirt and the collar 22 on the outlet tube during stocking, transport and insertion into the bowl, the tube and skirt should be prevented from being forced by the gaseous pressure. This is unlikely to occur while the pressure is prevailing and the valve is closed, but when the valve is manually operated a considerable pressure prevails within the sleeve 24 and tends to expand the skirt. Any such undesirable expansion is however precluded by the nut 5 when this has been assembled in the device.

When, as is frequently the case, an additional drain pipe or hose is to be attached to the outlet tube for discharge from a more remote point, e.g., at a considerably lower level, this can be readily achieved, since the exterior of the outlet tube is formed at 26 for ready coupling to the pipe or hose.

When it is desired to drain the bowl without releasing the air pressure, this can be done by grasping the outside of the pipe or hose (not shown) and pushing upwards. This causes the outlet tube 19 to compress the resilient sleeve 24 and the centre element 20 of the outlet tube contacts the end of the stem 11 of the valve and forces the valve off its seating, thus permitting liquid contaminant which has collected in the bowl to be expelled under pressure from the bowl. This manual operation can be accomplished even with reservoir pressure in the region of 200 psig.

At pressure above 50 psig the liquid contaminant will be expelled with considerable force and liquid will be followed by air under pressure.

By selecting the pipe or hose from a suitably stiff material of suitable length the valve can be manually operated even when the bowl is so far above the ground level that it cannot be reached by a man standing on the ground.

The groove 27 at the bottom of the outlet tube assists in retaining the added pipe or hose in its correct position relative to the outlet tube, but any appropriate means may be provided for this purpose. The outlet tube may be provided with an additional collar above the groove and the hole in the nut and such collar proportioned so as not to interfere with the assembly of the nut but so that the additional collar is of greater diameter than the bore of the additional pipe although of lesser diameter than the aforesaid collar 22.

Even if the additional pipe or hose is not fitted, the instinctive reaction when manually operating the valve is to grasp the outside of the tube so that the fingers are still protected from direct contact with the liquid contaminant and compressed air.

The construction of the device described permits of its main components being made by plastics moulding or by die casting technique and little or no machining is needed in their production.

What is claimed is:

1. A drain valve device for draining liquid contaminant such as oil and/or water, collected from gas under pressure within a bowl, said device comprising: a hollow valve casing having an inlet end and an outlet end and a valve seat and extendable through the bowl, a valve having a stem extending toward said outlet end of said casing and movable within said casing and closable against the valve seat by the gas pressure, means loading the valve to open the valve when the pressure sufficiently falls to permit the discharge of collected contaminant, and a contaminant outlet tube held captive in said valve casing and having an end engageable with but separate from said stem of said valve and manually displaceable to open said valve against the gas pressure by engagement of said end with said stem.

2. A valve device according to claim 1, in which the outlet tube projects from the valve casing sufficiently to enable it to be gripped and displaced to operate the valve without the risk of contaminant or compressed gas coming into contact with the operator's hand.

3. A valve device according to claim 1 in which the outlet tube has a spider-like inlet end for actuating the valve by engagement with the stem thereof and permitting passage of contaminant into the tube.

4. A valve device according to claim 1, in which said outlet tube has an external groove for connection to an additional drain pipe or hose.

5. A drain valve device for draining liquid contaminant such as oil and/or water, collected from gas under pressure within a bowl, said device comprising: a hollow valve casing having an inlet end and an outlet end and a valve seat and extendable through the bowl, a valve closable against the valve seat by the gas pressure, means loading the valve to open the valve when the pressure sufficiently falls to permit the discharge of collected contaminant, a contaminant outlet tube held captive in said valve casing but separate from said valve and manually displaceable to open said valve against the gas pressure, and the valve casing and the outlet tube having co-operating means whereby the tube can be snapped into a captive position in relation to said casing while being axially displaceable relatively to said casing for operating the valve.

6. A valve device according to claim 5, in which the casing comprises a skirt which is slotted and is elastically expansible and has internal projections, and the outlet tube has a collar which can be forced past said projections to captivate the tube.

7. A valve device according to claim 6, comprising a resilient sleeve within said casing which is axially compressible by the said collar during the insertion of the outlet tube so that it spring-urges the collar against the said projections when the tube is fully inserted and seals the tube with the casing while permitting axial displacement of the tube to displace the valve.

8. A valve device according to claim 6 in which the said skirt has a screw threaded portion, and comprising a nut which is apertured to permit passage of the outlet tube and co-operates with said screw-threaded portion of the skirt to anchor the device, the nut serving to prevent such expansion of the skirt by the gaseous pressure as might lead to disengagement of the collar on the outlet tube from the projections on the skirt when the valve is manually operated.

* * * * *